United States Patent [19]

Nakao

[11] Patent Number: 4,891,909
[45] Date of Patent: Jan. 9, 1990

[54] CLOSURE FOR TRIANGULAR WINDOW IN A VEHICLE BODY

[75] Inventor: Hirotake Nakao, Chiryu, Japan

[73] Assignee: Aisin Seiki Kabushiki Kaisha, Kariya, Japan

[21] Appl. No.: 331,170

[22] Filed: Mar. 31, 1989

[30] Foreign Application Priority Data

Mar. 31, 1988 [JP] Japan .................... 63-044508[U]

[51] Int. Cl.$^4$ .................................................. B60J 1/14
[52] U.S. Cl. .................................................. 49/391
[58] Field of Search ................ 49/391, 393, 390, 388, 49/392

[56] References Cited

U.S. PATENT DOCUMENTS

| 2,587,781 | 3/1952 | Stanfield et al. | 49/391 |
| 2,698,958 | 1/1955 | Adams | 49/391 X |
| 3,052,497 | 9/1962 | Lohr | 49/391 |
| 3,374,577 | 3/1968 | Salloum | 49/391 |
| 4,407,093 | 10/1983 | Spretnjak et al. | 49/391 |

Primary Examiner—Philip C. Kannan
Attorney, Agent, or Firm—Oblon, Spivak, McClelland, Maier & Neustadt

[57] ABSTRACT

In a vehicle body having a triangular window opening, a glass closure for the window is mounted on a shaft pivotably mounted in the body. The rotation of the shaft is limited by the engagement between a rotational stopper mounted on the shaft and a fixed stopper mounted to the vehicle body. The cam portion of the rotational stopper extends in the axial direction of the shaft.

7 Claims, 2 Drawing Sheets

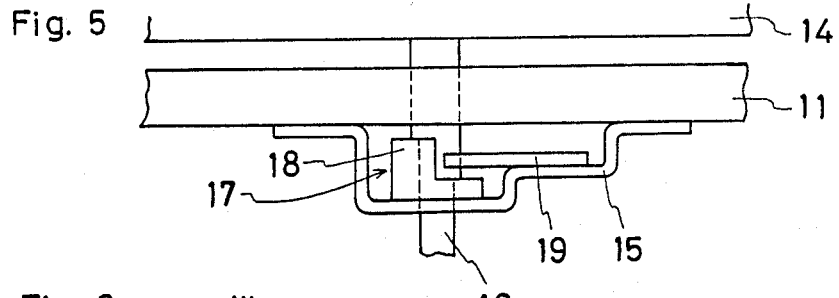
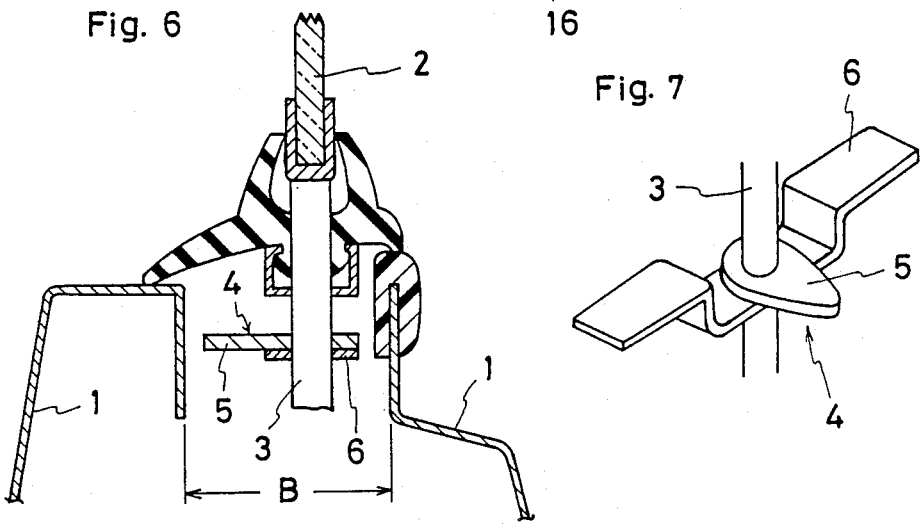
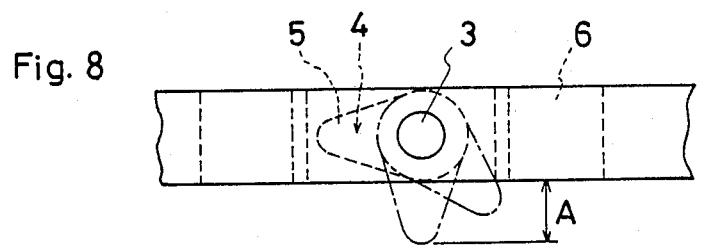
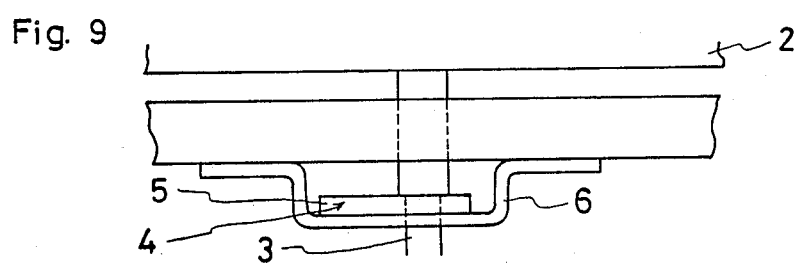

CLOSURE FOR TRIANGULAR WINDOW IN A VEHICLE BODY

BACKGROUND OF THE INVENTION

1. Field of the Invention

This invention relates to generally a triangular window mounted on a vehicle and more particularly to a closure for the triangular window having a stopper mechanism which determines when the window is in a full open state.

2. Description of the Related Art

In a conventional triangular window having a closure with a stopper mechanism as shown in FIGS. 6 to 9, a reference numeral 1 is for a vehicle body. A window glass 2 is the closure and is rotatably supported by a shaft 3. A cam 4 provided with a cam portion 5 is fixed to the shaft 3 so as to be integrally rotated with the same. The cam portion 5 of the cam 4 is radially projected from the shaft 3. A bracket 6 is fixedly connected to the vehicle body 1 and has portions located on the rotational locus of the cam portion 5 of the cam 4. The rotation of the shaft 3 is restricted by the engagement of the cam portion 5 and the bracket 6, thereby restricting the rotation of the glass 1 and determining the full opening state of the window.

However, the cam portion 5 is rotated with the rotational locus projecting radially of the shaft 3 in the above-mentioned stopper mechanism, as shown in FIG. 8. Therefore, a space for the projecting amount A of the cam portion 5 is required within the vehicle body 1 and the thickness B of the vehicle body 1 is increased. As a result, the vehicle weight and the cost are increased.

SUMMARY OF THE INVENTION

Therefore, it is an object of the present invention to provide an improved triangular window closure which obviates the above conventional drawbacks.

It is another object of the invention to provide an improved triangular window closure which permits a minimization of the thickness of the vehicle body.

The above, and other, objects are achieved according to the present invention by a window closure in a vehicle body having a triangular window formed thereon, in which the window closure mechanism comprises a shaft rotatably supported in the vehicle body, a glass fixed to the shaft so as to be rotated therewith for opening and closing the triangular window, a rotational stopper fixedly connected to the shaft so as to be integrally rotated therewith and provided with a cam portion which projects from the rotational stopper in the axial direction of the shaft, and a fixed stopper fixedly connected to the vehicle body and having one end portion located on the rotational axis of the cam portion, whereby contact between the rotational and fixed stopper determines the full opening state of the triangular window.

According to further features of the invention, the one end portion of the fixed stopper is provided with a contacting surface for contacting with the cam portion of the rotational stopper, and a bracket is fixed to the vehicle body, the bracket mounting the stationary stopper and rotatably supporting the shaft.

BRIEF DESCRIPTION OF THE DRAWINGS

Additional objects, features and advantages of the present invention will become more readily apparent from the following detailed description of preferred embodiments thereof when considered with reference to the accompanying drawings, in which:

FIG. 5 is a lateral view of the mechanism in FIG. 3;

FIG. 6 is a view similar to FIG. 2, but showing a conventional triangular window;

FIG. 7 is a view similar to FIG. 3, but showing a stopper mechanism of the conventional triangular window;

FIG. 8 is a view similar to FIG. 4, but showing the conventional stopper mechanism; and FIG. 9 is a view similar to FIG. 5, but showing the conventional stopper mechanism in FIG. 7.

DETAILED DESCRIPTION OF THE PREFERRED EMBODIMENT

Figure 1:
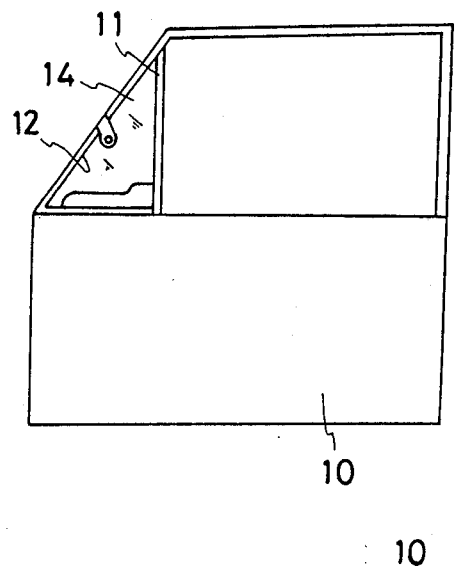
FIG. 1 is a view showing a triangular window according to the present invention.
Figure 2:
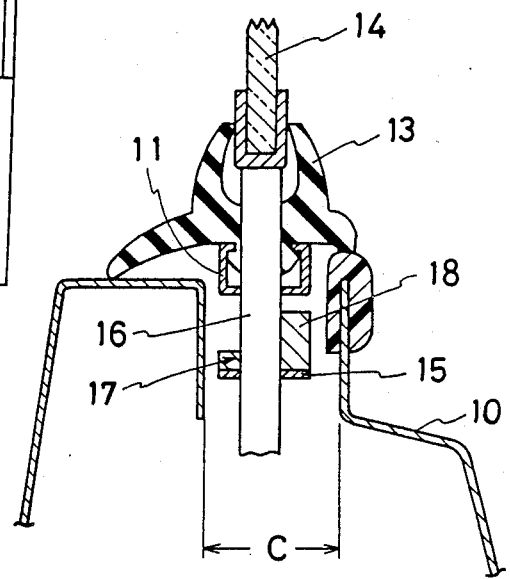
FIG. 2 is a cross sectional view of the main portion in FIG. 1.

Referring to FIG. 1, 2, a triangular window 12 is formed on a vehicle body 10 by a frame 11 and fixedly holds a glass as the closure via a seal member 13 fixed to the frame 11. As clearly seen from FIG. 2, the glass 14 is fixedly connected to a shaft 16 which is rotatably supported on a bracket 15 fixed to the frame 11. The shaft 16 extends through a hole in the frame 11. The bracket 15 has the same width as the frame 11. The glass 14 is integrally rotated with the shaft 16, thereby opening and closing the window 12.

Figure 3:
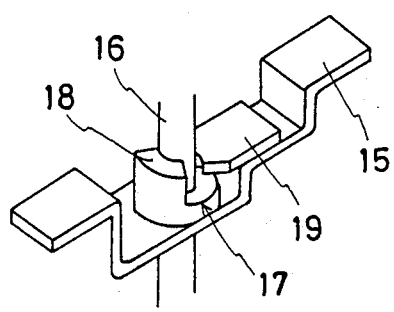
FIG. 3 is an orthogonal view of a stopper mechanism.
Figure 4:
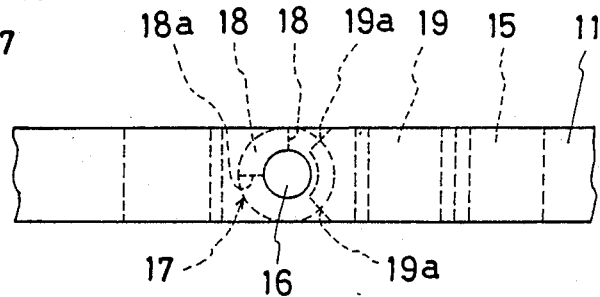
FIG. 4 is a plan view of the mechanism of FIG. 3.

As shown in FIGS. 3-5, a circular rotational stopper 17 is fixed to the shaft 16 so as to integrally rotate with the same. A cam portion 18 is upwardly projected from the rotational stopper 17, i.e., the cam portion 18 is entirely radially within the periphery of the rotational stopper. A fixed stopper 19 is rigidly connected to the bracket 15 and extends over the rotational stopper 17 so as to be located on the rotational locus of the cam portion 18. A contacting surface 19a is formed on both lateral surfaces of the fixed stopper 19 in order to contact with a contacting surface 18a of the cam portion 18.

The contacting surface 18a of the cam portion 18 is contacted with the contacting surface 19a of the fixed stopper 19 on the rotational stopper 17 by the rotation of the shaft 16, so that the rotation of the shaft 16 and the rotation of the glass 14 is restricted and the full opening state of the window 12 is established.

Thus, the contact between the cam portion 18 and the fixed stopper 19 is performed over the rotational stopper 17, and the rotational locus of the cam portion 18 is the same locus as the rotational stopper 17. Further, the cam portion 18 is not projected in the radial direction from the bracket 15. Accordingly, a thickness only for the width of the bracket 15 and frame 11 is required and the thickness C of the vehicle body 10 can be reduced as compared to a conventional vehicle body. As a result, the weight and cost of the vehicle body can be decreased.

As many apparently widely different embodiments of the present invention can be made without departing from the spirit and scope thereof, it is to be understood that the invention is not limited to the specific embodiments thereof except as defined in the appended claims.

What is new and desired to be secured by Letters Patent of the United States is:

1. In a vehicle body having a triangular window formed thereon, a window closure mechanism comprising:
   a shaft rotatably supported in said vehicle body;
   a glass fixed to said shaft so as to be rotated therewith for opening and closing said triangular window;
   a rotational stopper fixedly connected to said shaft so as to be integrally rotated therewith and provided with a cam portion which projects from said rotational stopper in the axial direction of said shaft; and
   a fixed stopper fixedly connected to said vehicle body and having one end portion located on the rotational locus of said cam portion, whereby contact between said rotational and fixed stoppers determines the full opening state of said triangular window.

2. A vehicle body as set forth in claim 1, wherein said one end portion of said fixed stopper is provided with a contacting surface for contacting with said cam portion of said rotational stopper.

3. A vehicle body as set forth in claim 1, wherein said cam portion is entirely radially within the periphery of said rotational stopper.

4. A vehicle body as set forth in claim 1 further comprising a bracket fixed to said vehicle body, wherein said fixed stopper is mounted to said bracket.

5. A vehicle body as set forth in claim 4 wherein said shaft is rotatably supported on said bracket.

6. A vehicle body as set forth in claim 1, wherein said rotational stopper is a circular shape.

7. A vehicle body as set forth in claim 6, wherein said cam portion is entirely radially within the periphery of said rotational stopper.

* * * * *